United States Patent [19]

Dodiuk

[11] Patent Number: 4,841,010
[45] Date of Patent: Jun. 20, 1989

[54] TRIGLYCIDYL ETHER/TETRAGLYCIDYL ETHER/ALKADIENE RUBBER/POLYALKYLENE POLYAMINE FORMULATION

[75] Inventor: Hanna Dodiuk, Haifa, Israel

[73] Assignee: State of Israel, Ministry of Defence, Armament Development Authorithy, Rafel, Haifa, Israel

[21] Appl. No.: 92,380

[22] Filed: Sep. 2, 1987

[51] Int. Cl.$^4$ .................. C08G 59/56; C08G 59/58
[52] U.S. Cl. ........................ 528/99; 528/94; 525/113
[58] Field of Search ................... 528/94, 99

[56] References Cited

U.S. PATENT DOCUMENTS

| | | | |
|---|---|---|---|
| 2,951,822 | 9/1960 | Reinking | 528/104 |
| 2,951,825 | 9/1960 | Reinking | 528/99 |
| 4,414,377 | 11/1983 | Andrews | 528/123 |
| 4,656,207 | 4/1987 | Jabloner et al. | 528/119 |
| 4,680,341 | 6/1987 | Newmann-Evans | 528/99 |

*Primary Examiner*—John Kight
*Assistant Examiner*—Frederick Krass
*Attorney, Agent, or Firm*—Browdy and Neimark

[57] ABSTRACT

The invention relates to epoxy resins which can be cured at ambient or slightly elevated temperature. The compositions can be used as adhesives and also as structural material. The epoxy resins of the invention retain advantageous characteristics at elevated temperatures, up to about 120° C. The compositions are advantageously supplied as two-pack kits which are contacted with each other when the epoxy resin is to be used. The first component is a mixture of at least two epoxides; the second component is a curing system which contains at least two amines.

The components are:

A. epoxies:
  (1) a tetraglycidyl diamino-diaromatic alkane
  (2) a triglycidyl ether of an amino aromatic alkane
B. amines:
  (1) a polyalkylene polyamine
  (2) an amino-terminated or carboxy terminated alkadiene rubber compound.

18 Claims, No Drawings

TRIGLYCIDYL ETHER/TETRAGLYCIDYL ETHER/ALKADIENE RUBBER/POLYALKYLENE POLYAMINE FORMULATION

FIELD OF THE INVENTION

The invention relates to epoxy resins which can be cured at room temperature, or at slightly elevated temperatures, and which retain their characteristics at rather high temperatures, in the range of up to about 120° C., without any appreciable deterioration of, for example, adhesive strength. The epoxy compositions can be used as such for a variety of purposes; they can be used with certain carriers (such as felt) or with a variety of fillers.

BACKGROUND OF THE INVENTION

In recent years, there has been an increasing demand from the aerospace industry and other industrial applications for epoxy materials having high temperature utility. High temperature utility can be improved through the use of anhydrides and aromatic amine curing agents as well as through the use of epoxy resin obtained by the eposidation, with peroxy compounds, of double bonds in certain Diels - Alder adducts. However, in many applications the high temperature curing is prohibitive. Studies indicate that temperature resistance is a function of crosslinking density of the cured resin, with higher crosslinking affording improvements in these properties. Higher crosslink density can be achieved by increasing the functionality of either the epoxy resin or the hardening agent. Thus there is a continuing search for new epoxy resins and hardening agents which can afford improvements in the properties of the cured materials.

Organic acid dianhydrides which contain either cyclic or aromatic structures and have high functionality have been found to impart improved heat resistance, as well as increased chemical and solvent resistance to cured epoxy resin compositions. Among such dianhydrides are pyromellitic dianhydride, cyclopentadiene dianhydride, and benzophenone tetracarboxylic dianhydride. The organic acid dianhydrides, while effective in imparting improved properties to cured epoxy resin compositions, suffer from the drawback that they are generally high melting solids which are not soluble in common solvents, nor epoxy resins, except at elevated temperature, and therefore curing at ambient temperature is not possible.

It has been discovered (J. A. Graham, VSP, 4,002,599 1977, see also J. A. Graham and J. E. O'Connor, Adhesive Age, July 1978 p. 20–23), that biphenyl anhydride epoxy curing agents are solubilized at ambient temperature in polyglycidyl derivatives of aminophenols to afford epoxy resin compositions curable at room temperature to provide epoxy systems characterized by high temperature resistance with a tensile lap shear at RT of about 2000 psi, and at 300° F. about 1000 psi, with no peel data being provided.

SUMMARY OF THE INVENTION

The compositions of the invention are two-component systems. They comprise:

a. A mixture of two curing agents, one for initiating the reaction at a moderate temperature and another which results in an enhanced toughness of the product; and b. A mixture of two epoxies, these polyfunctional epoxies resulting in a high degree of cross-linking; the one improving high temperature stability due to its high aromaticity, the other to reduce the viscosity of the composition so as to allow easy mixing at a moderate temperature.

A preferred embodiment of the invention relates to a composition which contains in combination two amine curing agents, one of the type of TETA for initiating the reaction at a moderate temperature, the other, of the ATBN type, which results in toughness of the product; in admixture with two polyfunctional epoxy components, which provide an adequate degree of cross-linking: one of the components being an epoxy of the TGDDM type which improves stability at high temperature (in the 120° C. range), the other being of the TGAP type which reduces the viscosity of the mixture and facilitates handling, at ambient temperatures. The mixture of the curing agents is easily solubilized at ambient temperature in polyglycidyl derivatives of the TGDDM and TGAP type, resulting in epoxy resin compositions which can be cured at ambient temperature and which, after cure, are characterized by high temperature shear and peel resistance. The present invention is characterized by a number of unexpected features, which are contrary expectations according to the prior art:

a. Aliphatic amines were known to provide products having excellent properties at ambient temperatures, but little if any utility at high temperatures and having a high heat distortion;

b. TGDDM-cured epoxy resins generally required temperatures above 100° C., and usually compositions of this type were known which could be cured, mainly at elevated temperatures, providing a product of high heat distortion.

c. Epoxy resins cured with amines of this type were known to give brittle products, and the flexibility and toughness of the products of the present invention was unexpected.

The mixture of the curing agents is solubilized at ambient temperature in a suitable liquid such as polyglycidyl derivative of TGDDM and GAP, resulting in an epoxy resin composition which undergoes curing at ambient temperature, resulting in a cured product having a high temperature shear and peel resistance. It is of course possible to effect the curing at slightly elevated temperatures, shortening the cure time.

Amongst the advantageous properties of the adhesive compositions of the present invention there can be mentioned the following:

a. The novel adhesive epoxy resin/amine systems can be cured at ambient temperature, resulting in an adhesive which retains its useful characteristics at elevated temperatures, up to a range of about 120° C.

b. The novel compositions are useful for a wide variety of purposes, in addition to the use as adhesive, such as for molding, for the production of laminates, as coatings, for potting, for encapsulating, for forming reinforced plastics, all of which resulting in products which retain their properties up to elevated temperatures in the range of up to about 120° C.

c. The novel compositions are useful for producing products which have to retain high degrees of adhesion at elevated temperatures, yet which cannot be cured at elevated temperatures due to the inherent dangerous characteristics of the bonded materials such as propellants and the like. Damaged parts made of certain materials cannot be heated in an autoclave at a predetermined temperature. The properties of the above defined compositions of the invention are contrary to expectations as it has been hitherto believed that aliphatic amine curing agents afford cured products which have highly advantageous properties at ambient temperature, but which have little if any utility at elevated temperatures, such as the range of the present invention of up to 120° C.

Hitherto TGDDM curing of epoxy resins has been carried out in the 100° C. temperature range, and it was assumed that no effective curing could be done at room temperature.

Furthermore, the compositions of the prior art indicated that epoxy resins cured with amines generally afforded rather brittle products.

It could not be predicted that the combination with ATBN would result in a composition which can be easily handled and cures at ambient temperature to give a product of adequate flexibility and toughness having high resistance to peel stresses.

A specific example of such two-component epoxy resin system which is curable at ambient or higher temperatures, has two components, comprising:

a. A resin mixture of tetraglycidyl-4, 4'-diaminodiphenyl methane (TGDDM) and a triglycidyl ether of p-aminophenol (TGAP) of the following formulae:

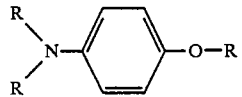

wherein R designates

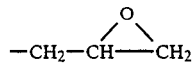

the second component comprising a mixture of triethylenetetramine (TETA) and an amino-terminated butadiene acrylonitrile (ATBN) of the following formulae:

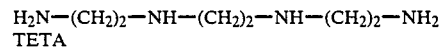
TETA

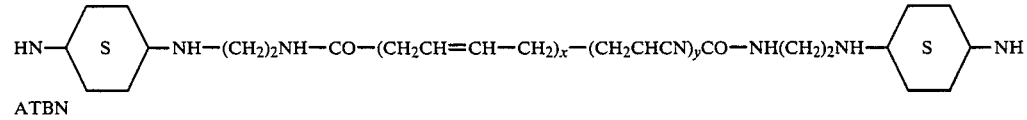
ATBN wherein x and y are integers, as shown.

The invention also relates to compositions of matters where the two-component epoxy-resin system of the invention is blended with other resins, such as other epoxy resins and also by other amines, which can be liquid or solid and which are also curing agents.

There can be incorporated into compositions of the invention other film-forming polymeric materials, carriers etc. These can be provided to impart improved flexibility and impact resistance. Carriers improve and control bond line thickness. There may be provided compositions of the invention which comprise additives of the type conventionally used in the art with epoxy resins, such as solvents; fillers, which may be of any suitable type, such as metallic fibres; plasticizers, flexibilizers, reinforcing agents in fibre or other form, coupling agents, antioxidants, catalysts and the like.

The preferred two-component system of the invention, comprising a mixture of TGDDM and TGAP as one component, and TETA and ATBN, as the second component, can be stored separately over prolonged periods of times. For use, the two are admixed with each other, advantageously at the job site. The components are advantageously provided in a cooled state, and contacted with each other under cooling. It is advantageous to first admix the two components of the epoxy and the curing agent and then to admix the two mixtures.

It is possible to admix the two components at room temperature and to effect curing at ambient temperature. It is advantageous to resort to a gentle heating of the epoxy resins, in the range to 50 to 80° C. which facilitates the mixing of its two components. The final composition cures at room temperature, and a period of the order of seven days is required to attain adequate curing. The mixture remains workable for about 2 hours after mixing, and before crosslinking has reached such a degree as to prevent further work with such compositions. The curing can also be carried out at elevated temperatures, say 150° C. for 2 hours. No advantageous properties result from curing at elevated temperatures. When it is feasible, the mixture can be cured at about 50° C. for 1 or 2 hours, and subsequently at room temperature, which substantially shortens the overall curing time.

The following examples are illustrative of the invention. In the examples, amounts are parts by weight, unless otherwise stated.

EXAMPLE 1

Several epoxy resins/amine curing agents are prepared according to the following formulations:

| Ingredients | COMPOSITION | | | | | |
|---|---|---|---|---|---|---|
| | 1A | 1B | 1C | 1D | 1E | 1F |
| * MY-720 (TGDDM) | 50 | 50 | 50 | 50 | 50 | 50 |
| * ERL-510 (TGAP) | 40 | 40 | 40 | 40 | 40 | 40 |
| * TETA | 20 | 20 | 19.3 | 18.6 | 20 | 18.6 |
| * ATBN | — | — | 13.5 | 36 | — | 36 |
| * CTBN | 14.9 | — | — | — | 14.9 | — |
| EMI | | | | | 4.0 | 4.0 |
| Felt | — | — | — | + | — | — |

The chemical formulas are given in the previous section. EMI is 2-Ethyl4-methyl imidazole and CTBN is carboxy terminated butadiene acrylonitrile.

The individual epoxy resins are sequentially blended into the curing agents at room temperature. A homogenous suspension is obtained. When ATBN is used, it is mixed with TETA prior to the mixing with epoxy resins. When CTBN is used, the epoxy rubber prepolymer is prepared at 150° C., with mechanical stirring under nitrogen flow, using triphenyl phosphine (0.15 percent)

as catalyst. In some cases, preheating of some components was needed to lower their viscosity and promote mixing.

The individual compositions are employed to bond sand-blasted, solvent degreased, anodized or etched aluminum parts or steel parts. Cure is obtained at room temperature after 6-7 days. The bonded assemblies are tested for tensile lap shear (LSJ) in accordance with the procedure of ASTM D-1002-64 and for T-Peel in accordance with that of ASTM - D - 1867 at room temperature (RT), 85°-95° C., 120° C. The results are reported in Table 1.

TABLE 1

| Composition | LSJ (MPa) | | | T-Peel (N/mm) | | |
|---|---|---|---|---|---|---|
| | RT | 85-95° C. | 120° C. | RT | 85-95° C. | 120° C. |
| 1A | 22.0 | 14.0 | 8.5 | 0.29 | 0.40 | 0.50 |
| 1B | 20.0 | 14.5 | 12.0 | 0.10 | 0.15 | 0.25 |
| 1C | 20.0 | 13.0 | 11.0 | 0.30 | 0.35 | 0.30 |
| 1D | 23.0 | 16.2 | 9.3 | 1.10 | 0.20 | 0.20 |
| 1E | 28.3 | 18.5 | 11.7 | 0.20 | 0.10 | 0.10 |
| 1F | 27.3 | 15.8 | 15.0 | 0.30 | 0.19 | 0.12 |

The data demonstrates the substantial shear and peel strength of the formulations. All compositions give high shear strength at room temperature and elevated temperatures (85°-95° C., 120° C.).

EXAMPLE 2

Several epoxy/resin curing agents are prepared according to the following compositions.

| Ingredients | Compositions | | | | |
|---|---|---|---|---|---|
| | 2A | 2B | 2C | 2D | 2E |
| * MY-720 (TGDDM) | 60 | — | 50 | 50 | 50 |
| * ERL-510 (TGAP) | — | 72 | 40 | 40 | 40 |
| * EPON 828 (a) | 40 | 40 | — | — | — |
| * PACM-20 (b) | — | — | 45 | — | — |
| * TETA | 16.4 | 12 | — | 20 | — |
| * DETA (c) | — | — | — | — | 20 |

(a) The bis phenol A/Epichlorhydrin Epoxy resin; Shell Chemical Corporation,
(b) di-para amino cyclohexyl methane.
(c) diethylene triamine The individual epoxy resins are sequentially blended into the curing agents at room temperature. The individual compositions are employed to bond sand-blasted, solvent degreased, anodized, or etched aluminum parts. Cure is obtained at room temperature after 6-7 days. The bonded assemblies are tested for shear as previously described.

TABLE 2

| Compositions | LSJ RT | (MPa) 120° C. |
|---|---|---|
| 2A | 9.6 | 9.6 |
| 2B | 9.3 | 2.2 |
| 2C | 5.4 | 15.6 |
| 2D | 14.7 | 10.2 |
| 2E | 14.5 | 11.5 |

The data demonstrates the substantial shear strength of formulations 2A and 2D, 2E both at RT and at 120° C.

I claim:

1. A twin-pack system for producing epoxy resins which retain mechanical and adhesive properties at elevated temperatures, up to about 120° C., and which can be cured at ambient or slightly elevated temperatures,
wherein pack (1) comprises in combination:
   a. a tetraglycidyl diamino-diaromatic alkane, and
   b. a triglycidyl ether of an amino aromatic compound; and
wherein pack (2) comprises in combination: a curing system consisting of:
   a. a polyalkylene-polyamine; and
   b. an aminoterminated or carboxyterminated alkadiene rubber compound.

2. A two-pack system according to claim 1, where the constitients of pack (1) are in combination a tetraglycidyl-4,4'-diaminophenyl alkane and a triglycidyl ether of an aminophenol.

3. A two-pack system according to claim 1, where the components of pack (1) comprise tetraglycidyl-4,4'-diaminodiphenyl methane (TGDDM) and triglycidyl ether of p-aminophenol (TGAP).

4. A two-pack system according to claim 1, where the components of pack (2) comprise:
a poly-ethylenepolyamine, comprising $n(-CH_2)_2-NH-$ groups, where n is an integer from 1 to 6, and an aminoterminated or carboxyterminated alkadiene acrylonitrile.

5. A system according to claim 4, where the components are triethylene tetramine (TETA) and aminoterminated or carboxyterminated butadiene acrylonitrile (ATBN).

6. A composition according to claim 1, containing, in addition an additive selected from one or more of film-forming polymers, carriers, fillers, plasticizers, flexibilizers, reinforcing agents, coupling agents, antioxidants, catalysts and felt-type or non-woven fabric type supports.

7. A composition according to claim 1, which contains, one or more additional epoxy resins and/or additional amines.

8. A two-pack system according to claim 1, where the individual components are provided in separate form, and where the Pack (1) and Pack (2) components are admixed before use, and Pack (1) and Pack (2) are subsequently contacted with each other for epoxy resin preparation.

9. A composition according o claim 1, for use as adhesive, where the composition is applied to a felt as carrier.

10. A composition according to claim 6, containing about 3 to 6 parts 2-ethyl-4-methyl imidazole.

11. A process for the production of the epoxy resin of claim 1, for use as an adhesive or for forming or repairing articles, including completion and reconstruction of missing parts of a 3-dimensional body which comprises admixing the amine curing agents, blending sequentially the epoxy constituents into the curing agent, and curing the resulting composition at between ambient temperature and about 80° C.

12. A process according to claim 11, where the curing is effected between ambient temperature and about 50° C.

13. A process according to claim 11, where the two-pack components are stored under refrigeration before use.

14. A cured product of the twin-pack system according to claim 1 obtained by mixing pack (1) and pack (2) and effecting curing at a temperature from about ambient to about 50° C.

15. A composition according to claim 1 consisting essentially of from about 40% to 75% of a triglycidyl ether of p-aminophenol; about 40% to 60% of either tetraglycidyl-4,4'-diaminodiphenyl methane or a mixture of tetraglycidyl-4,4'-diaminophenyl methane and an epoxy polyglycidyl resin of the bis phenol A type; 10-25% of triethylene tetramine; and about 12-40% of a compound selected from the group consisting of an amino-terminated butadiene acrylonitrile, carboxy-terminated butadiene acrylonitrile, and a mixture thereof.

16. A composition according to claim 5 consisting essentially of 40-60% of tetraglycidyl-4,4'-diaminodiphenyl methane, 40-72% of a triglycidyl ether of p-amino phenol, 12-20% of triethylenetetramine, and 12-36% of an amino-terminated butadiene acrylonitrile, a carboxy terminated butadiene acrylonitrile or a mixture thereof.

17. A composition for producing at ambient or only a slightly elevated temperature, a cured epoxy resin having high temperature shear and peel resistance at elevated temperatures up to about 120° C., said composition consisting essentially of
(1) a mixture of polyglycidyl compounds including
   (a) a tetragylcidyl diamino-diaromataic alkane and
   (b) a triglycidyl ether of an amino aromatic compound;
(2) a mixture of curing agents including (a) a polyalkylene-polyamine and (b) an aminoterminated alkadiene rubber-type compound; and
(3) optionally an additive selected from the group consisting of one or more film-forming polymers, carriers, fillers, plasticizers, flexibilizers, reinforcing agents, coupling agents, antioxidants, catalysts and felt-type or non-woven fabric type supports.

18. A process according to claim 11 wherein said curing is effected in two stages comprising a first stage for up to two hours at a temperature slightly above ambient temperature up to 50° C., and a second stage at ambient temperature.

* * * * *